US010491698B2

(12) United States Patent
Agarwal et al.

(10) Patent No.: US 10,491,698 B2
(45) Date of Patent: Nov. 26, 2019

(54) DYNAMIC DISTRIBUTION OF PERSISTENT DATA

(71) Applicant: International Business Machines Corporation, Armonk, NY (US)

(72) Inventors: Kanak B. Agarwal, Austin, TX (US); Patrick J. Bohrer, Cedar Park, TX (US); Ahmed Gheith, Austin, TX (US); Michael D. Kistler, Austin, TX (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 15/373,437

(22) Filed: Dec. 8, 2016

(65) Prior Publication Data

US 2018/0167475 A1    Jun. 14, 2018

(51) Int. Cl.
*H04L 29/08* (2006.01)
*H04L 29/06* (2006.01)

(52) U.S. Cl.
CPC ............ *H04L 67/26* (2013.01); *H04L 63/101* (2013.01)

(58) Field of Classification Search
CPC ................................ H04L 67/26; H04L 67/42
USPC ........................................................ 709/217
See application file for complete search history.

(56) References Cited

U.S. PATENT DOCUMENTS

| 5,966,531 | A | 10/1999 | Skeen et al. |
|---|---|---|---|
| 7,269,618 | B2 | 9/2007 | Nakajima |
| 7,788,674 | B1 | 8/2010 | Siegenfeld |
| 7,814,204 | B1 | 10/2010 | Wang et al. |
| 8,108,672 | B1 | 1/2012 | Herbach et al. |
| 8,131,729 | B2 | 3/2012 | Berry et al. |
| 8,527,461 | B2 | 9/2013 | Ducott, III et al. |
| 8,782,391 | B2 | 7/2014 | Raj et al. |
| 8,904,047 | B1 | 12/2014 | Kornfeld et al. |

(Continued)

OTHER PUBLICATIONS

Belaramani, Nalini, et al., "PRACTI Replication", Proc. Networked Systems Design & Implementation, v. 3, pp. 59-72 (May 2006).

(Continued)

*Primary Examiner* — Wing F Chan
*Assistant Examiner* — Leon Y Tseng
(74) *Attorney, Agent, or Firm* — Mercedes L. Hobson; Jack V. Musgrove

(57) ABSTRACT

A dynamic data distribution system allows publication of data values for hierarchical keys (paths) and subscriptions to key (path) patterns which include wildcard characters. Permission to publish or subscribe is controlled by an access control list associated with each key. An agent receives a publication request from a client, verifies client access permissions on the subject key, and transmits the publication to a data storage server which performs the write. Following a successful write, the agent forwards the publication to a message routing exchange which routes the publication to the session queue for all clients that are permitted to receive the publication and have subscribed to a key pattern matching this publication. For data synchronization, the data storage server assigns a virtual time stamp to each write, and the subscriber verifies the count of updates received for a subscription within a sliding window of virtual time stamps.

20 Claims, 7 Drawing Sheets

(56) References Cited

U.S. PATENT DOCUMENTS

| | | | |
|---|---|---|---|
| 9,081,975 | B2 | 7/2015 | Ducott, III et al. |
| 9,208,347 | B2 | 12/2015 | Alexandrian et al. |
| 2006/0010195 | A1 | 1/2006 | Mamou et al. |
| 2007/0174232 | A1* | 7/2007 | Barcia ............... H04L 51/00 |
| 2010/0293145 | A1 | 11/2010 | Das et al. |
| 2013/0104251 | A1 | 4/2013 | Moore et al. |
| 2014/0244721 | A1 | 8/2014 | Taine et al. |
| 2015/0271255 | A1* | 9/2015 | Mackay ............ H04L 67/101 709/226 |
| 2015/0286671 | A1* | 10/2015 | Ebiyama ............ G06F 9/467 707/692 |
| 2016/0183030 | A1 | 6/2016 | Cregg |
| 2016/0261395 | A1 | 9/2016 | Agarwal et al. |

OTHER PUBLICATIONS

Birman, Ken, "Consistency Options for Replicated Storage in the Cloud", Microsoft Cloud Futures 2010 (Apr. 2010).

Birman, Ken, et al., "Hosting Dynamic Data in the Cloud with Isis2 and the Ida DHT", Proc. ACM SIGOPS Conf. on Timely Results in Operating Systems (Nov. 2013).

Braam, Peter, "The Coda Distributed File System" [online], retrieved on Nov. 16, 2016 from the Internet URL: www.coda.cs.cmu.edu/ljpaper/lj.html (1998).

Chase, Jeffrey, "Asynchronous Replication and Bayou", Duke University Dept. of Computer Science (Nov. 2002).

Cooper, Brian, et al., "PNUTS: Yahoo!'s Hosted Data Serving Platform", Proc. VLDB Endowment, v. 1, n. 2 (Aug. 2008).

Friedman, Roy, et al., "Strong and Weak Virtual Synchrony in Horus", Proc. Symposium on Reliable Distributed Systems, p. 140 (1995).

Google, "Firebase—App success made simple" [online], retrieved on Nov. 15, 2016 from the Internet URL: https://firebase.google.com (2016).

IBM, "MQSeries Publish/Subscribe Applications" IBM International Technical Support Organization (Sep. 2001).

Liskov, Barbara, et al., "Viewstamped Replication Revisited", MIT technical report MIT-CSAIL-TR-2012-021 (2012).

Kang, Brent, et al., "The Hash History Approach for Reconciling Mutual Inconsistency", Proc. IEEE Int'l. Conf. on Distributed Computing Systems, p. 670 (2003).

Meteor, "Meteor Guide" [online], retrieved on Nov. 15, 2016 from the Internet URL: https://guide.meteor.com (2016).

Papaemmanoul, Olga, et al., "Extensible Optimization in Overlay Dissemination Trees", Proc. SIGMOD Int'l. Conf. on Management of Data, pp. 611-622 (2006).

Petersen, Karin, et al., "Flexible Update Propagation for Weakly Consistent Replication", Proc. ACM Symposium on Operating Systems Principles, pp. 288-301 (Oct. 1997).

Pubnub, "Publish/Subscribe Messaging" [online], retrieved on Nov. 15, 2016 from the Internet URL: https://www.pubnub.com/products/publish-subscribe (2016).

Rethinkdb, "The open-source database for the realtime web" [online], retrieved on Nov. 15, 2016 from the Internet URL: https://www.rethinkdb.com (2016).

Rhea, Sean, et al., "Pond: the OceanStore Prototype", Proc. USENIX Conf. on File and Storage Technologies pp. 1-14 (2003).

Seagate Technology LLC, "Lustre filesystem" [online], retrieved on Nov. 16, 2016 from the Internet URL: http://lustre.org/ (2016).

Terry, Douglas, et al., "Managing Update Conflicts in Bayou, a Weakly Connected Replicated Storage System", Proc. ACM symposium on Operating Systems Principles, pp. 172-182 (Dec. 1995).

Vigfusson, Ymir, et al., "Dr. Multicast: Rx for Data Center Communication Scalability", ACM European Conf. on Computer Systems (2010).

* cited by examiner

DYNAMIC DISTRIBUTION OF PERSISTENT DATA

BACKGROUND OF THE INVENTION

Field of the Invention

The present invention generally relates to data distribution, and more particularly to a publish-subscribe system where some clients publish various data along multiple paths and other clients subscribe to selected paths to receive published data.

Description of the Related Art

Modern communications systems have enabled a wide variety of data distribution techniques. For example, advanced networks such as the Internet combined with mobile electronic device (e.g., cellphone) technology have allowed practically all recorded information to be delivered to a user at the touch of a finger.

In the early days of the Internet, users could subscribe to various topics for discussion through systems such as Usenet, which allowed users to read and post messages to one or more categories, known as newsgroups. Usenet resembles a bulletin board system (BBS) in many respects and is the precursor to Internet forums that are widely used today. Usenet newsgroups are hierarchical in nature, and are denoted by words or word fragments separated by a period, e.g., "misc.invest", "misc.invest.stocks", or "misc.invest.stocks.ipo".

Software applications (apps) have also been devised to automatically gather data for particular purposes. For example, a user (client) may have a stock management app installed on a cellphone which periodically queries a stock price source such as a publicly available financial management web site (server) to see what the latest share prices are for selected stocks. The web site might alternatively be private and require some sort of user authentication. To provide ongoing updates, a server monitors changes in a database or the state of some event, for example, by polling the database or periodically observing the event for any changes from previous state.

Systems have also been devised to handle the distribution of more diverse data from a multitude of sources (publishers) to random clients (subscribers) in a centralized fashion. An exemplary publish-subscribe (pub-sub) system 2 is shown in FIG. 1 and includes a number of publishing clients 4, a number of subscribing clients 6, and a pub/sub manager 8. According to this model, publishers 4 (senders of messages) do not program the messages to be sent directly to specific subscribers 6 (receivers). Instead, the messages or events are published without any knowledge of any subscribers there may be, and subscribers similarly receive only those messages that are of interest, without any knowledge of the publishers. Messages are published to topics, i.e., named logical paths similar to usenet newsgroups. Pub/sub manager 8 acts as a message broker by receiving published messages, and then forwards them on to those subscribers who are registered to receive them. Pub/sub manager 8 may physically constitute a number of servers which are not necessarily co-located.

Different protocols can be used to provide the data. The most commonly used internet protocol is the hypertext transfer protocol (HTTP), but this protocol only supports a request-response model where clients initiate the requests and the servers respond to the client requests. In the standard HTTP model, a server cannot "push" responses back to a client without a corresponding request pending from the client. In a live query type pub-sub system, servers directly push the content back to clients. This type of operation can be achieved through other protocols such as Web Socket that support bi-directional communication between client and server. Many messaging systems support pub/sub models in their application programming interfaces (APIs), e.g., Java Message Service.

SUMMARY OF THE INVENTION

The present invention in at least one embodiment is generally directed to the dynamic distribution of persistent data. The system can use a plurality of agents including a first agent which receives a publication request from a first client to publish a specific data value to a specific data path of a data storage facility having a variety of data values stored in different data paths. A second agent receives a subscription request from a second client to subscribe to the specific data path. The first agent determines that the first client is entitled to publish to the specific data path based on an access control list uniquely associated with the specific data path, transmits a write request to the data storage facility, receives a write acknowledgement from the data storage facility, and transmits the specific data value and the specific data path to a master routing exchange as a publication. The second agent creates a client message exchange and client session queue with a routing configuration that directs publications the second client is entitled to receive and match the subscription request from the master routing exchange to the client session queue. The master routing exchange receives the publication and performs the message routing as configured by the second agent, which delivers the publication to the client session queue for the second client. The second agent receives the contents of the session queue and transmits a corresponding subscription update to the second client, preferably as a push transmission using a bidirectional communications protocol. The subscription request can include a path pattern having one or more wildcard characters defining a set of paths which include the specific data path. The data storage server also maintains a server log of publications to the specific data path ordered by the virtual time stamp, and maintains a table containing latest data values for the publications. To keep the client data synchronized, the second client can maintain a client log of certain publications received as subscription updates ordered by a virtual time stamp representing a relative time of receipt of a given publication request, and provide to the second agent a client count of all entries in the client log that match the subscription data path and have a corresponding virtual time stamp that lies between a current reliable time stamp and a proposed reliable time stamp. When the second agent receives the client count for the data path with a request to advance the current reliable time stamp to the proposed reliable time stamp, it obtains from the data storage server a count of all entries in the server log that match the data path and compares the server count with the client count, and if the server count is greater than the client count, it sends a frontier of data comprising a set of non-redundant publications, including the latest data values, which match the subscription, have an access control list that permits read access to the client, and have a virtual time stamp which lies between the current reliable time stamp and the proposed reliable time stamp. The data storage server can periodically compute a minimum virtual time stamp, and trim the server log by removing any entries having a corresponding virtual time stamp that is less than the minimum virtual time stamp.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1:
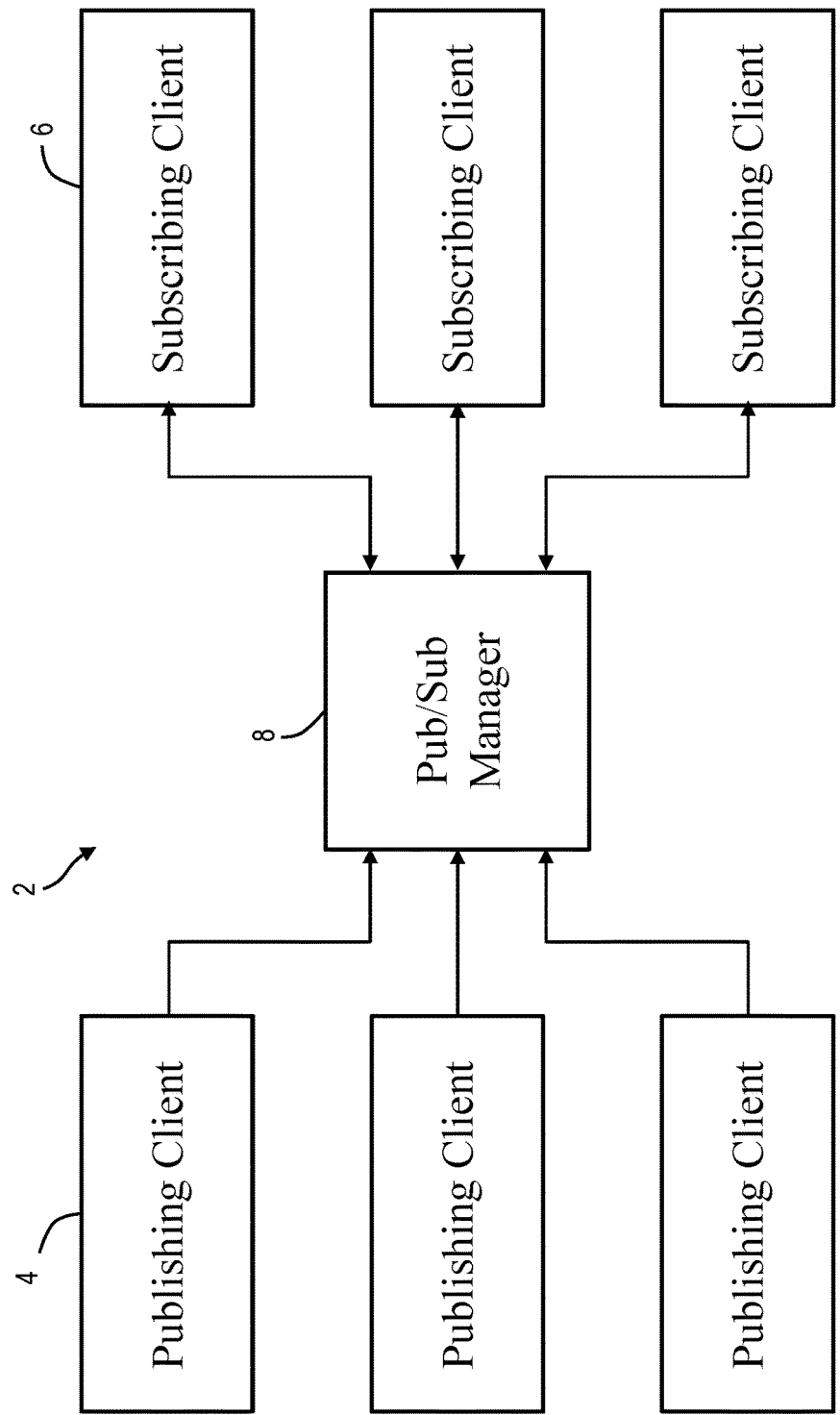
FIG. 1 is a high-level block diagram of a conventional publish-subscribe (pub-sub) system.

Conventional systems for storage and retrieval of persistent data provide great network scalability and a dynamic network topology, but still lack support for several important features. For example, some prior art systems (e.g., database systems) are deficient in the provision of data in real-time. Real-time refers to a system where input data is processed so quickly that it is practically available immediately as feedback. Today, users expect to interact in real-time. Whether it's collaboration, live streams, multi-player games, backend monitoring, group chat or location tracking, real-time is the standard for modern app experiences. The infrastructure to provide these experiences is complex, and app developers do not want to build this themselves. Another area that is lacking in some data distribution systems relates to flexibility in subscribing to data paths. If a user wants to track the price of a company's stock, it is easy to specify a message path such as "shares.ibm.price" and get occasional updates. But if the user wants information on all stock prices, there is no way to generate a query that can include patterns to cover that. Still another area that is lacking pertains to restricting access to particular news, i.e., for paying customers only. In some current systems, there is no method for adding authentication and access control that can find a way to map the security model to the native security mechanism of the database and pub/sub service. Finally, data synchronization is woefully lacking in prior art systems. Clients are unable to use a mobile device's local store to cache data or allow disconnected operations.

It would, therefore, be desirable to devise a framework that could store and deliver application data synchronized in near real-time, and usable across multiple app instances/devices/users, all while enforcing access controls. It would be further advantageous if the framework could allow for data subsets matching wildcard patterns, and support online and offline operation, with efficient resource usage. These and other advantages are achieved in various embodiments of the present invention.

In an illustrative system data model constructed in accordance with the present invention, a key/value store is provided where the key is a string with a particular structure (i.e., a topic), such as components joined by a separator (e.g., the period symbol "." or the slash symbol "/"). Keys form a hierarchical key space, and a value is treated as arbitrary uninterpreted data. Three operations can be performed on the store: (i) publishing a value to a specific key, optionally specifying an access control list (ACL); (ii) subscribing to a key or key pattern where some components of the key are wildcard characters defining a subset of the key space, such as the asterisk symbol "*" (representing one part in the key, e.g., "a.*.c" will match "a.x.c", "a.y.c", and "a.z.c" but not "a.p.q.c",), or the pound symbol "#" (representing the rest of the key, e.g., "a.b.#" will match "a.b.x", "a.b.y", "a.b.z", and "a.b.p.q." as well as "a.b"); and (iii) deleting a specific key and its associated value.

A client software development kit (SDK) can be provided to developers which includes a client application programming interface (API) for these operations. In one implementation the client SDK is initialized and configured by creating an instance of a Context Sync class (CSync) such as:

CSync cs=CSync.connect(serverUrl, securityToken), wherein "serverUrl" is the network address (e.g., universal resource locator) for the database server or agent managing the data, and "securityToken" is an authentication token the server can use to determine the client's access rights to keys in the data store. The publish operation can be used, for example, to change/update the price of a company's stock stored in a database (presuming the user has appropriate privileges). An invocation of the publish operation might for example look like:

d=cs.pub("shares.ibm.price", "200")

to change the price of IBM stock to a value of 200. In the preferred implementation, the CSync publish contract ensures that the user will never be able to change/create/delete data unless entitled, the user (publisher) can always publish even if disconnected from the network, the user can always observe local updates, and any failed updates will eventually be undone locally.

In one implementation the subscribe operation is implemented as a method of the same CSync class, and an invocation of the subscribe operation can for example take the form:

d=cs.subscribe("shares.ibm.price")

to subscribe to IBM shares data. If a user wanted to subscribe to all shares data, the invocation of subscribe could be:

d=cs.subscribe("shares.#")

in which case the user will get data for all shares keys the user is entitled to see according to the respective access control lists for the different key stores. Subscribing to "shares.*" could provide data for all ticker symbols. Subscribing to "shares.*.news.#" could provide data for all news feeds relating to all companies covered by the database. In the preferred implementation, the CSync subscribe contract ensures that the user (subscriber) will eventually see all data for keys matching the subscription pattern that they are entitled to see, the user will never see something not entitled to, a given subscription will never see the same data twice, data will be delivered in near real-time when connected, and data updates will never be observed moving backwards in time.

Figure 2:
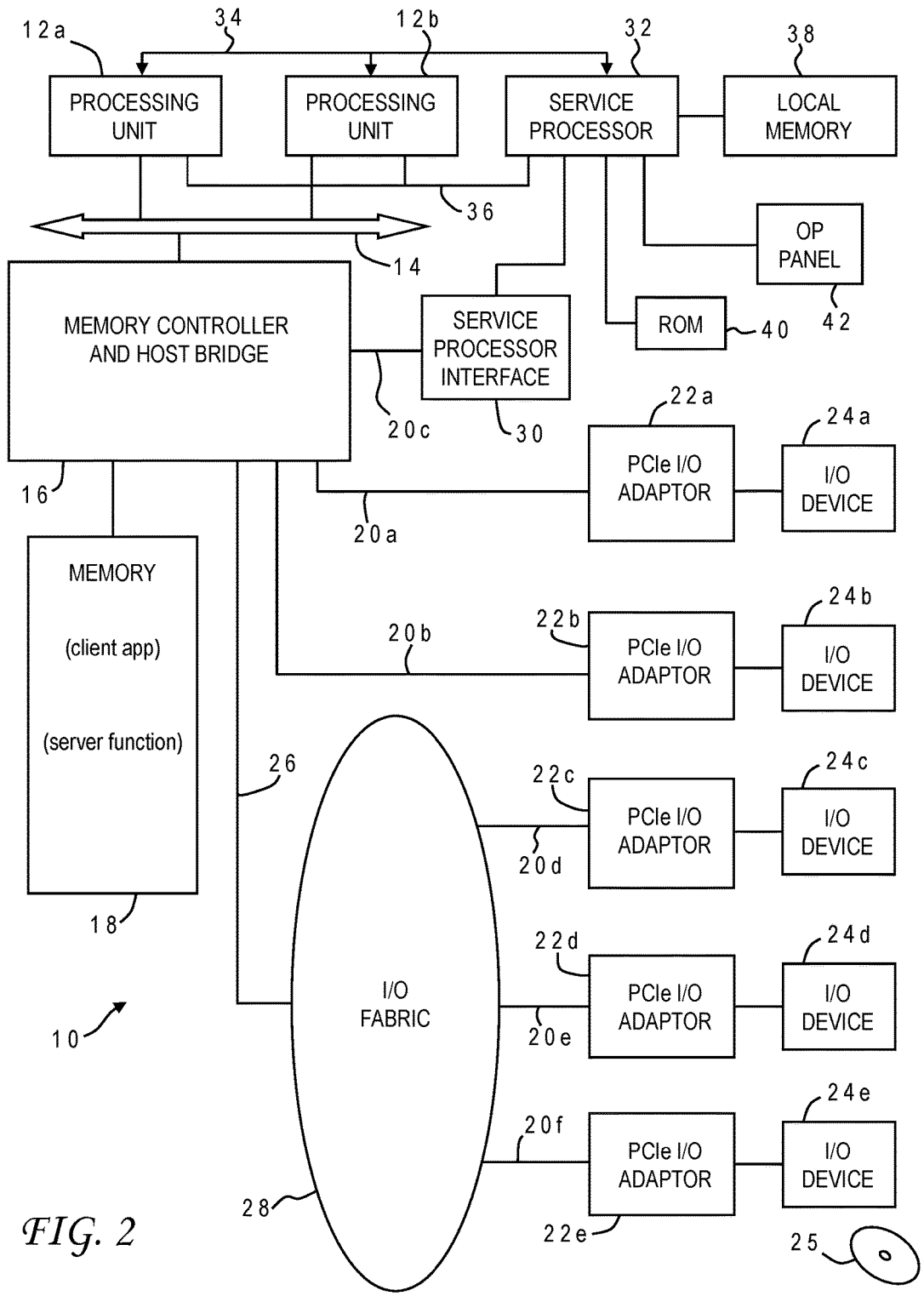
FIG. 2 is a block diagram of a computer system programmed to carry out either client apps or server functions for a messaging system in accordance with one implementation of the present invention.

With reference now to the figures, and in particular with reference to FIG. 2, there is depicted one embodiment 10 of a computer system in which the present invention may be implemented as either a client or server to carry out various messaging functions. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein an appropriate client app or server software in accordance with the present invention.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network. While computer system 10 as disclosed conforms to desktop or notebook architectures, the invention may further be carried out on a mobile electronic device such as a cellphone, standard features of which may be found in conventional descriptions such as that given in U.S. Pat. No. 8,615,504 (see FIG. 5 and accompanying text) which is hereby incorporated.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the messaging system of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a data distribution system that uses novel control techniques to manage data publication and/or subscription. Accordingly, a program embodying the invention may include conventional aspects of various pub-sub tools, and these details will become apparent to those skilled in the art upon reference to this disclosure.

Figure 3:
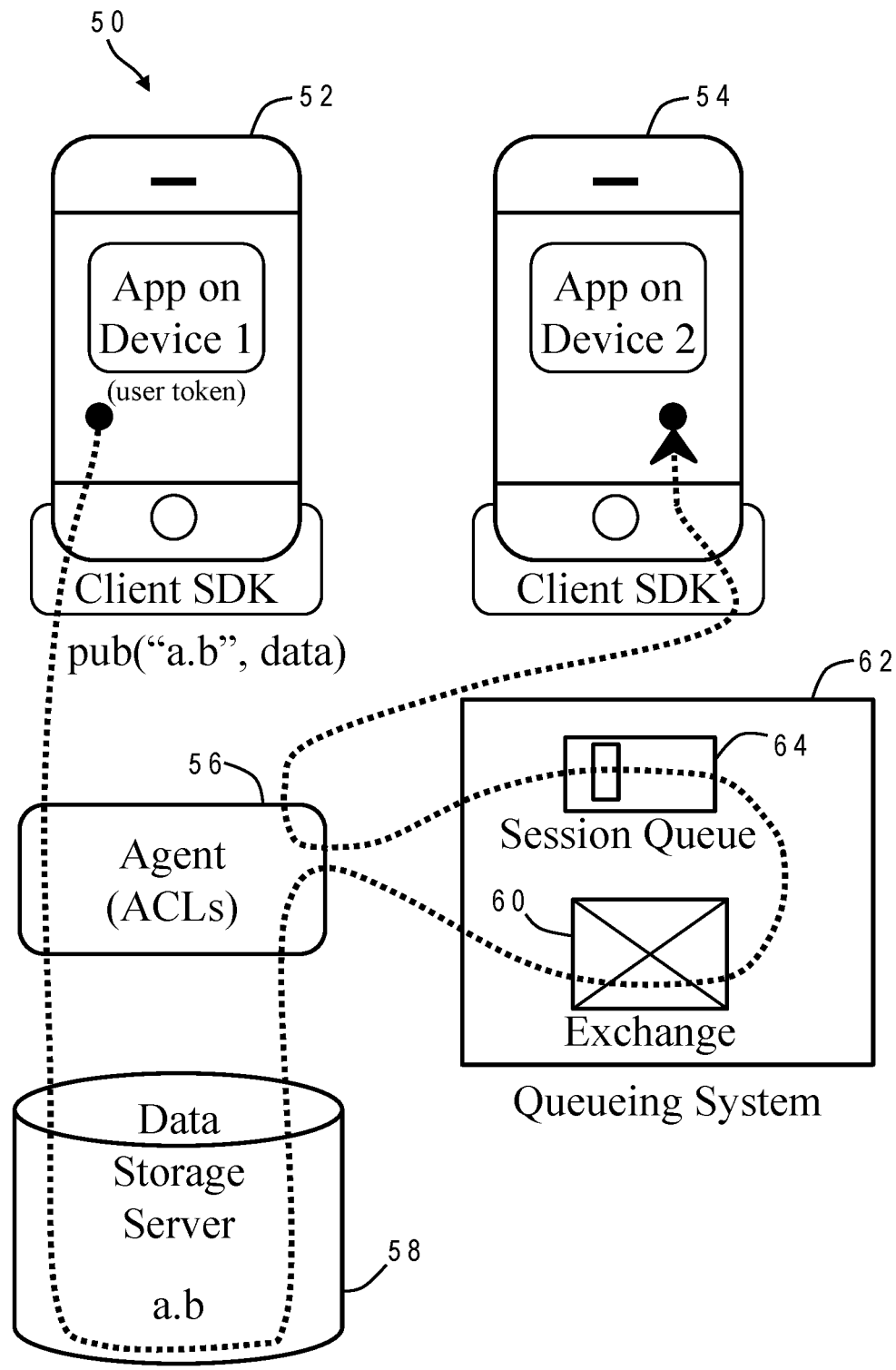
FIG. 3 is a block diagram of a basic pub-sub system constructed in accordance with one implementation of the present invention.

Referring now to FIG. 3, there is depicted a simplified embodiment 50 of a pub-sub system designed in accordance with the present invention in which a first client acting as publisher operates a first client device 52 and a second client acting as subscriber operates a second client device 54. A client SDK has been used by each device 52, 54 to implement the previously described publish and subscribe operations for one or more apps loaded on the devices. Either client may be an individual interacting with the messaging system manually, or an app running on the electronic device which is automatically gathering various data according to the app features or user customization/input.

The dotted line in FIG. 3 represents the path that published data takes to get from publishing device 52 to subscribing device 54. In this example the first client is publishing data to the key "a/b", and the CSync class has specified a network address for an agent 56 (the various connections seen in FIG. 3 can be made over a network such as the Internet). Agent 56 handles all of the client connections, for example, using the Web Socket protocol. Agent 56 can verify the authenticity of the user tokens supplied by the clients on device 1 and device 2 and map each token to an internal user ID (identification number). Agent 56 can further verify that the client on device 1 has appropriate permission to publish to the particular key using an access control list (ACL) specific to that key; the ACLs can be mirrored across multiple agents. The specific store for key "a/b" may be located on a data storage server. The data storage server may be a relational database management system, such as Postgres. As a database server, its primary function is to store data securely, and to allow for retrieval at the request of other software applications. It can handle workloads ranging from small single-machine applications to large Internet-facing applications with many concurrent users. Agent 56 requests the data storage server 58 to perform the write operation. Data storage server 58 carries out the write operation, i.e., durably writes the transmitted data to the key within the database, and sends a write acknowledgement to agent 56.

Figure 4:
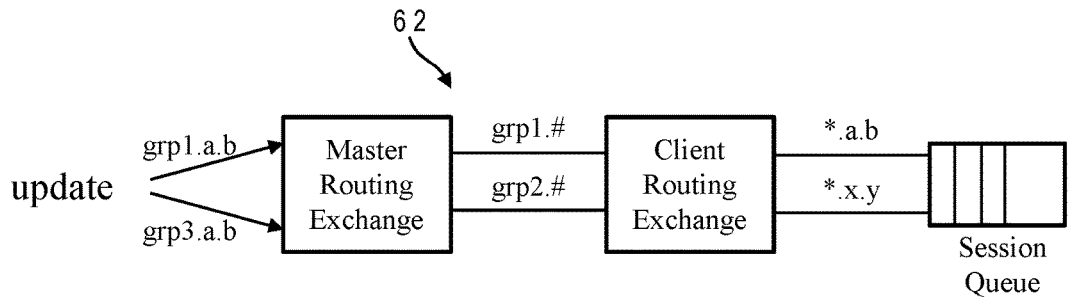
FIG. 4 is a block diagram illustrating how message routing can be used to enforce access controls in the delivery of subscriptions to clients in accordance with one implementation of the present invention.

After the write is acknowledged, agent 56 publishes it to the master exchange 60 on a message queueing system 62 once for every ACL group with read access to the key. As seen in FIG. 4 which shows an update to key "a.b" with an ACL permitting read access to groups "grp1" and "grp3", agent 56 can further determine the set of ACL groups to which the client on device 2 belongs ("grp1" and "grp2" in this example), and create bindings from the master routing exchange to the client routing exchange that route any updates readable by one of these groups from the master routing exchange to the client routing exchange. In response to the subscription request to key "a.b" from client 2, agent 56 creates a binding from the client routing exchange to the client 2's session queue that routes any updates for key "a.b" from the client routing exchange to client 2's session queue.

Exchange 60 is preferably a message broker (message-oriented middleware) that implements the advanced message queuing protocol, such as a RabbitMQ server modified to operate as taught herein. Each connected (and recently connected) subscriber client has a corresponding session queue 64 in messaging system 62 into which messages destined for that client are deposited and a client routing exchange which routes messages that the client is allowed to read from the master routing exchange to client session queues that have outstanding subscriptions matching the key that was updated. This two-level routing of update messages ensures that the client only receives updates it is permitted to read and that match the client's current subscriptions.

A client can assign itself a random session ID before first connecting to an agent. In the illustrative implementation session IDs are long-lived and clients are expected to reuse them across multiple connections. A session ID uniquely maps to a distinct session queue in the queueing system that the agent creates if it does not already exist. The agent also subscribes to this queue so as to deliver writes to the client. The agent can communicate with the session queue using a private protocol such as that used by RabbitMQ. Thus, agent 56 will receive the contents of session queue 64 and transmits a corresponding subscription update to the subscribing client 54, finishing the delivery of the data.

Agent 56 can unsubscribe to a client's messaging queue when it detects loss of connectivity to the corresponding client. However, that queue is left standing so that messages may continue to be held for delivery when the client reconnects, potentially through a different agent. The use of a common session ID permits a different agent to subscribe to the same queue. If a client is not connected to the system, its session queue can accumulate writes that will be delivered to it upon reconnection. The queueing system can maintain an unconnected session queue for a configurable period, after which time both the queue and its contents are deleted. Such timeout-based session queue deletions are how the system garbage collects queueing resources. The timeout may be configured such that short disconnects (such as when stepping into an elevator) do not lead to queue (and message) deletion.

Figure 5:
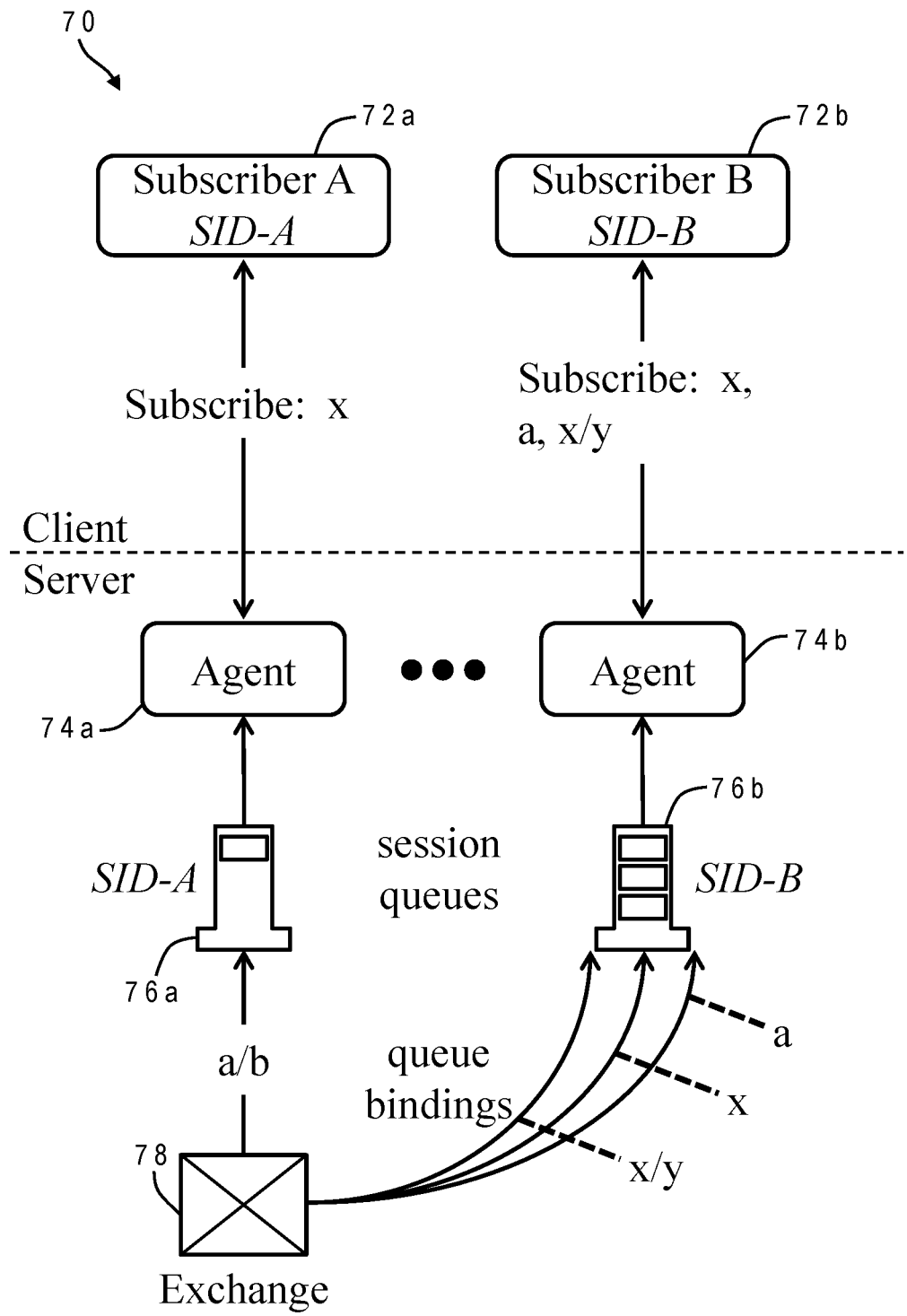
FIG. 5 is a block diagram of a pub-sub system constructed in accordance with one implementation of the present invention depicting the use of routing keys by which session queues are bound to a global exchange.

FIG. 5 shows a slightly more complicated implementation 70 of the data distribution system of the present invention where there are two subscribers 72a, 72b, with the latter subscriber having multiple subscriptions. Subscriber A (72a) has subscribed to path "x", while subscriber B (72b) has subscribed to paths "x", "a", and "x/y". Subscriber A communicates with a first agent 74a while subscriber B communicates with a second agent 74b. Subscriber A and subscriber B are on the client side of the system, while the agents 74a, 74b and other features of FIG. 5 are on the server side, that is, they are implemented on remote computer systems accessible via the network. Agent 74a uses the session ID from subscriber A (SID-A) to map subscriber A to a first session queue 76a. Session queue 76a receives messages for key "a/b" from exchange 78. Agent 74b similarly uses the session ID from subscriber B (SID-B) to map subscriber B to a second session queue 76b. Session queue 76b receives messages for keys "x", "a", and "x/y" from exchange 78. Each subscription thus translates into a separate binding of the session queue. As noted above, a separate routing layer is used to handle access control.

The present invention further envisions a protocol for efficient data synchronization which allows clients to maintain a local cache of data to support operation when disconnected. Clients can be disconnected for arbitrarily long periods of time. Sometimes this can be due to clients subscribing and unsubscribing to data based on user activity. Client access to data can also change based on ACL changes. Communication channels between client and server are often unreliable as well (message loss). In some implementations of the present invention these problems are overcome using an Advance Protocol to efficiently synchronize the client's local data store with the data available at the server. According to one version of the advance protocol, all committed writes to the data store are assigned a unique, monotonically increasing ID, referred to as a virtual time stamp (VTS). The VTS is a mechanism for totally ordering writes within the system. In the preferred implementation, the VTS for a write is a logical time stamp assigned by the data storage server. For each active subscription (key or key pattern), the client maintains a "reliable" VTS (RVTS), which is the largest VTS for which the client knows that it holds the most recent value for all keys matching the key pattern.

The nominal goal of the Advance Protocol is to move the RVTS forward for a given active subscription. The data storage server can keep a log ordered by VTS of all updates to a key. The server can also keep a "latest" table containing the latest value for each known key. Updates to the log and latest table are performed in a transaction. Each client can keep its own log ordered by VTS of all data delivered to the client. To advance the RVTS for a key pattern p to a later value RVTS', the client counts all the entries in its log between RVTS and RVTS' that match pattern p. It sends this count to the server. The server performs the same count in its log. If the counts agree, the client is up to date and the server informs the client that it can advance to RVTS'. If the counts do not agree, the server sends the client the "frontier" of data matching the key pattern and that the client is permitted to read from the "latest" table (paginated if necessary). The frontier of data is the set of writes in a VTS interval where each write in the set has both been performed and is the most recent (i.e., has the largest VTS) for its key/path within the interval. The recency metric for a key pattern can be configurable.

When a key is deleted, this is recorded in both the log and latest table of the data storage server. The delete is assigned a new VTS to indicate that it is the most recent update to the key. If the ACL on a key is changed, this change is recorded at the data storage server as two updates: a delete of the key with the old ACL followed by a publish operation for the key with the new ACL.

Figure 6:
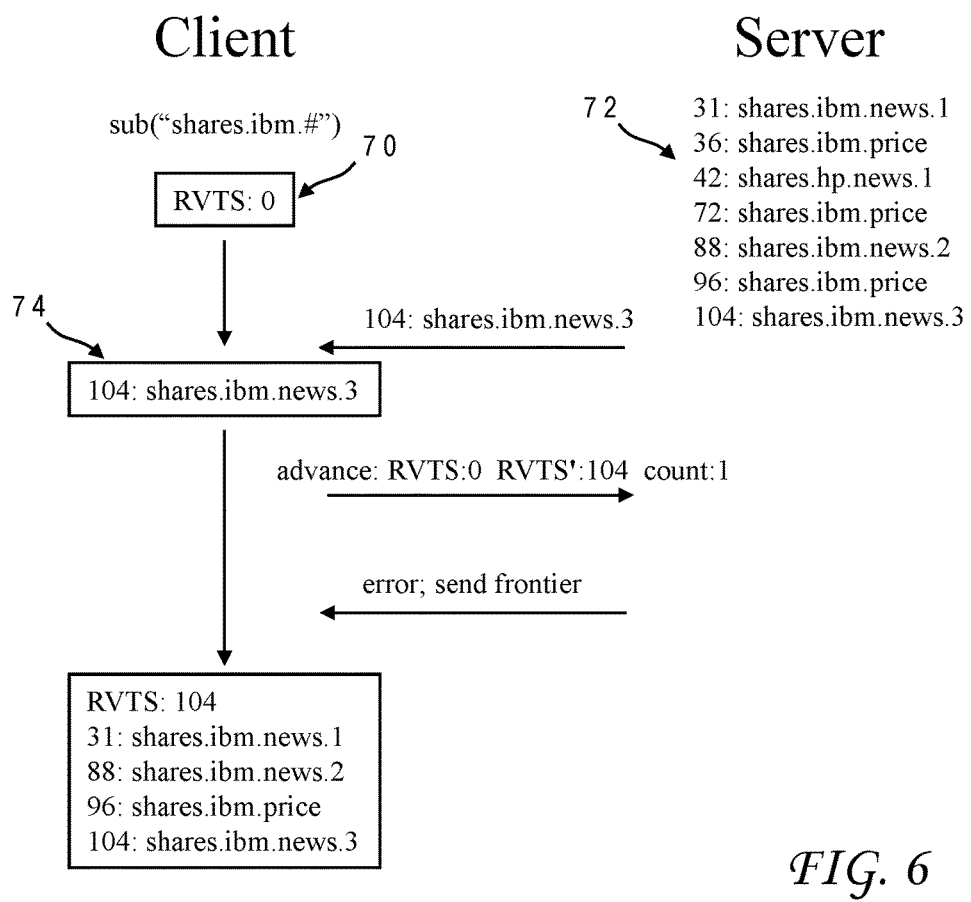
FIG. 6 is a pictorial representation of an example of an Advance Protocol which may be used in accordance with the present invention to efficiently synchronize a client's local data store with the data available at the server.

An example of the Advance Protocol is seen in FIG. 6 where a client has subscribed to a key pattern "shares.ibm.#", and the register 70 storing the RVTS is set to zero, i.e., the client has no reliable time stamp for this key pattern (for example, the client had not previously subscribed to this key pattern). A server has recorded seven recent updates in a log 72. Each log entry as shown begins with a VTS; for example, the first entry "31: shares.ibm.news.1" indicates that the "shares.ibm.news.1" key was updated with a VTS of 31. There were three updates for key "shares.ibm.price", with VTSs of 36, 72 and 96. There was also an update to key "shares.ibm.news.2" with a VTS of 88. The last update "104: shares.ibm.news.3" has a VTS of 104. When the client reconnects with the network, the server transmits this last update to the client. Some time later, the client attempts to advance the RVTS (from 0 to 104) by sending an advance request with the current and proposed RVTS values to the server along with a count of all of the entries in the client log 74, that count now being one. Upon receiving the advance request, the server checks log 72 to determine that there are six keys matching the wildcard pattern for the client subscription, because there are six matching keys in the log having VTS values lying between 0 and 104. Since the server count (6) does not match the client count (1), the server transmits a response to the advance request which includes the frontier of data:

31: shares.ibm.news.1
88: shares.ibm.news.2
96: shares.ibm.price
104: shares.ibm.news.3

The message to key "shares.hp.news.1" at VTS 42 is not sent because that key does not fit the wildcard pattern for the client subscription. The messages to key "shares.ibm.price" at VTS 36 and VTS 72 are not sent because there is a later message at VTS 96 with the same key. Those skilled in the art will appreciate that wildcard characters other than "*" and "#" may be used.

Once the frontier data is processed at the client, it can advance the RVTS to 104, i.e., there is an authorization inherent in the frontier transmission to promote RVTS. The example of FIG. 6 has been simplified for illustration, as the number of messages in the frontier may be greatly higher. This Advance Protocol accordingly avoids sending any redundant data when the client is already up-to-date, and allows the state of the client to be expressed in a very compact form (three long integers), providing a very efficient mechanism for the server to check the validity of the client state. Once the client is up-to-date, the frequency of the RVTS advance can be reduced since a live-data path should keep the client in sync (only need to worry about dropped messages).

The queueing system may very well re-order writes. The client SDK can check each received publish against the frontier it is maintaining for the path. A newly arrived publish from the queueing system is silently dropped if it is already subsumed by the path's existing frontier at the client.

The Advance Protocol can further be used in conjunction with access control lists (ACLs) to help ensure eventual consistency with no data loss. A problem can arise when a client is added to an ACL for a key advancing its RVTS for a matching key pattern to a value that is later than a VTS for an update to the newly accessible key. Consider the example where a server initially holds two writes to "a.b.#" in its log, the first log entry being "90: a.b.d, acl2" and the second log entry being "95: a.b.c, acl1", where "acl2" is the ACL for key "a.b.d" and "acl1" is the ACL for key "a.b.c.". Further to this example, a client initially has read permission on "acl1" but not on "acl2". When the client subscribes to "a.b.#", the Advance Protocol sends "95: a.b.c" to the client, and the client sets its RVTS for key "a.b.#" to 95. Later, a new write on the server updates "acl2" to give the client read permission to "acl2". The next advance should thus send "90: a.b.d" to the client, but since it has a VTS (90) lower than the client RVTS (95), the server would not know to send the newly accessible update. To avoid this issue, the client can maintain an RTVS for each active subscription/ACL for which it has read permission. The client can query the server to determine what ACLs allow it to read. When a client determines that it has been added to a new ACL, it can initiate an Advance Protocol for all active subscribes with the new ACL and an RVTS of zero.

The Advance Protocol utilizes logs on both the client and the server to determine if the client is missing updates, but the size of the logs can present a problem if they grow unbounded. Clients may be disconnected for arbitrarily long periods of time, so if the server deletes log entries and later a reconnected client presents a count that includes some of these deleted entries, the server cannot determine whether the client is up-to-date. Some implementations of the present invention address this issue using server-side log trimming. This procedure introduces a new value $VTS_{min}$, a minimum VTS value maintained by the server. The Advance Protocol is extended to handle the situation wherein the client RVTS is less than the server $VTS_{min}$. In such a case where the server receives an advance request from a client, the server can send the latest data for all entries matching the key/pattern and the ACL. The new RVTS is then set to the largest VTS of the returned values. This approach relies on the "latest" table storing all delete operations as well.

A tunable log-trimming procedure can select a $VTS_{min}$ using a feedback control loop that seeks to achieve a predetermined percentage of clients with an RVTS which is less than $VTS_{min}$, e.g., a very small value such as 1%. The $VTS_{min}$ can be stored in the database, so log entries with a VTS less than $VTS_{min}$ can be lazily trimmed. A control (feedback) loop can be used to determine $VTS_{min}$. A sensor tracks the total number of advance requests, and the number of requests with $RVTS<VTS_{min}$. A histogram of VTS-RVTS can be constructed, and a controller (such as a PID controller) can be used to calculate a delta, measured in number of entries or time, as the smallest size log to achieve the target percentage requests with $RVTS<VTS_{min}$. The system can periodically choose a new $VTS_{min}$ using this procedure.

Figure 7:
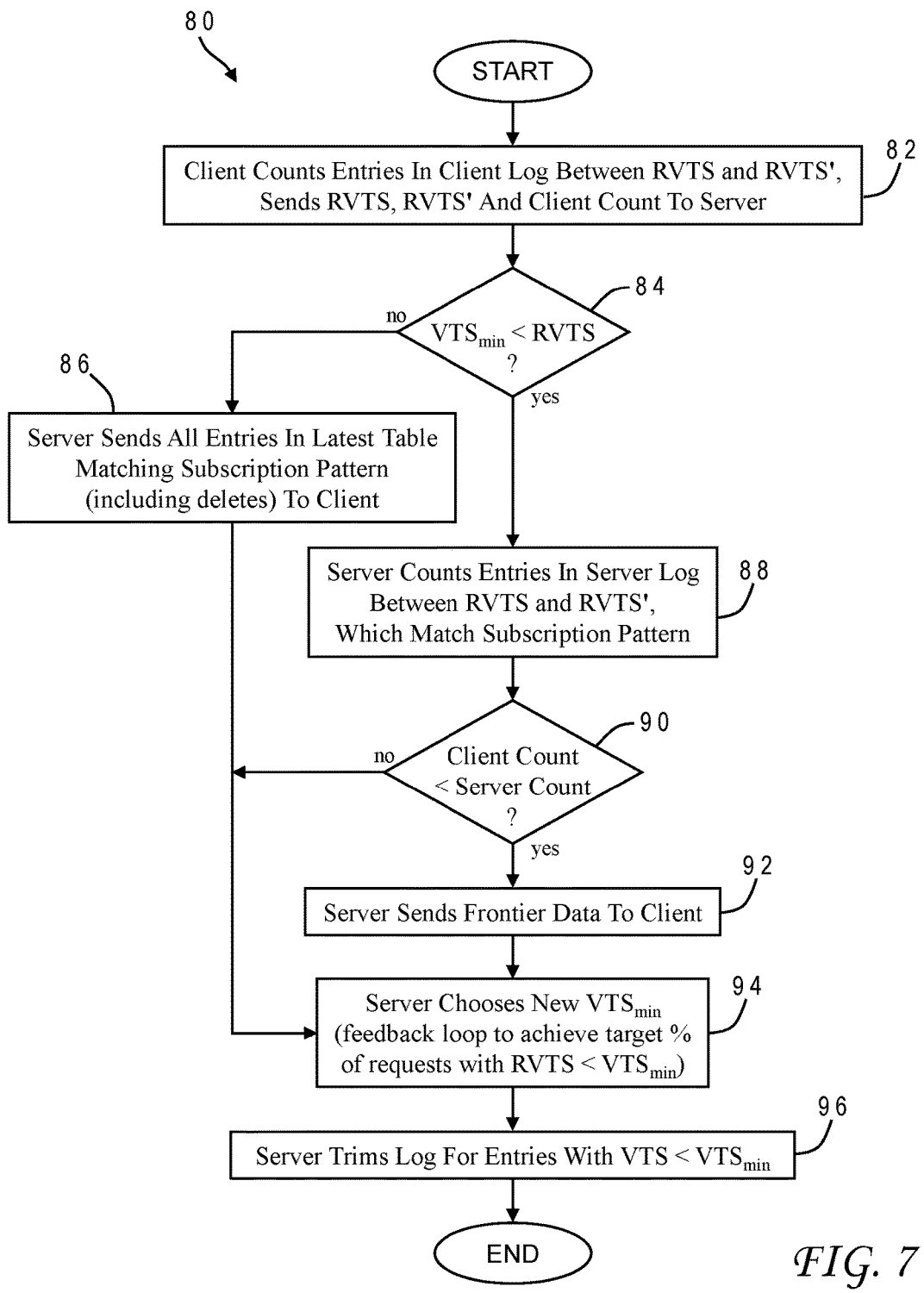
FIG. 7 is a chart illustrating the logical flow for a synchronization process with server-side log trimming in accordance with one implementation of the present invention.

This extended Advance Protocol may be further understood with reference to the chart of FIG. 7 which illustrates the logical flow for a synchronization process 80 with server-side log trimming. The process begins with the client counting the entries in its log between RVTS and RVTS', and sending that count along with the RVTS and RVTS' to the server (82). The server then determines whether $VTS_{min}$ is less than RVTS (84). If not, the server must send all entries in the frontier of the key pattern to the client (86), which brings the client up-to-date. If $VTS_{min}$ is less than RVTS, the server continues by counting entries in its own log between RVTS and RVTS' that match the subscription pattern (88). The server then determines whether the client count is less than the server count (90). If not, then the client is already up-to-date. If the client count is less than the server count, the server sends the frontier data to the client (92). Once the client is up-to-date (from its initial state, or from box 86, or from box 92), the process is essentially complete except for the log trimming. The server will periodically choose a new $VTS_{min}$ using the feedback loop to achieve the target percentage of advance requests with an RVTS less than $VTS_{min}$ (94). Entries in the server log with a VTS less than $VTS_{min}$ can then be removed (96).

Figure 8:
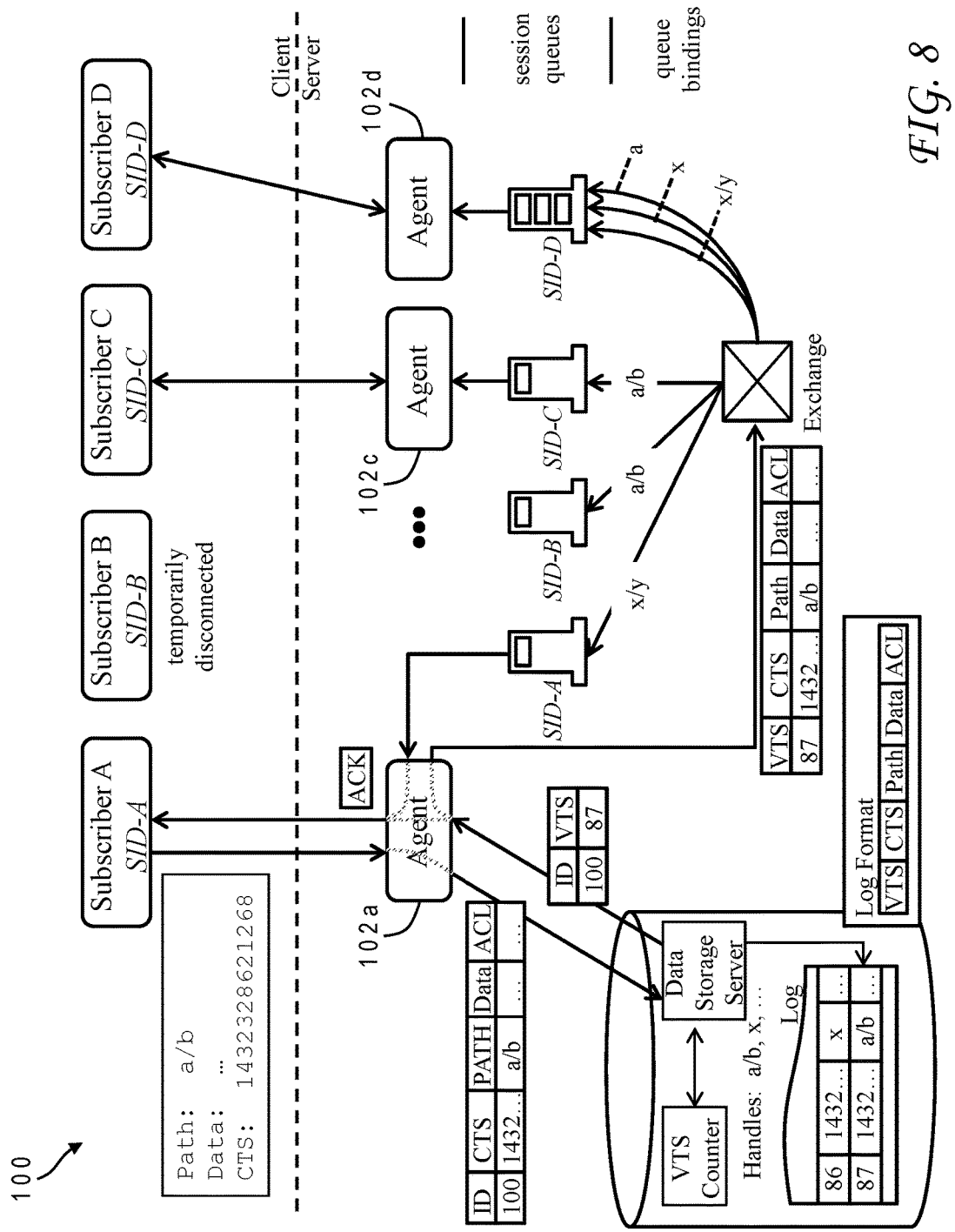
FIG. 8 is a block diagram of a pub-sub system constructed in accordance with one implementation of the present invention showing a full published path as well as how a client can be temporarily disconnected but its session queue and binding still remains.

Several of the foregoing features are depicted in FIG. 8, which shows a pub-sub system 100 constructed in accordance with one implementation of the present invention with a full published path, and also shows how a client can be temporarily disconnected but its session queue and binding still remains. In this example, there are four Subscribers A, B, C and D, each having a unique session ID (SID-A, SID-B, SID-C, SID-D). Subscriber A has subscribed to key "x/y", Subscriber B has subscribed to key "a/b", Subscriber C has also subscribed to key "a/b", and Subscriber D has subscribed to keys "x/y", "x", and "a". The dashed line in FIG. 8 provides an indication of client side and server side, that is, the four subscribers are all client side, and the remaining components are server side. Connections between the components are handled using the various communications protocols previously described.

Subscriber A is also a publisher in this diagram, having write access to key "a/b". Subscriber A issues a publish operation to an agent 102a for this key, with a client time stamp (CTS) of "1432328621268". The CTS is used by the server to enforce ordering of writes from a specific client. Agent 102a verifies the authenticity of Subscriber A's token and maps it to an internal client ID of "100". Agent 102a then transmits an update request to the data storage server. That update request includes the client ID, the CTS, the key (path), the ACL, and the data, i.e., store value. When the update request is received, the data storage server uses a VTS counter to assign a VTS to the update. The data storage server adds the update to a log, in the format of VTS, CTS, path, ACL, data. In this example, the previous update (before the publish by Subscriber A), had been assigned a VTS of "86", so the publish from Subscriber A is now assigned a VTS of "87" by the data storage server. This VTS is returned to agent 102a. Agent 102a sends an acknowledgement (ACK) of the write operation back to Subscriber A so it can log the VTS, i.e., upon receipt of the acknowledgement, Subscriber A can write the published data to its local store. Agent 102a also packages the update into a message and delivers it to the exchange. The exchange then routes the message to separate session queues, for each client subscription matching that key. Subscriber B has subscribed to that key "a/b", but is currently disconnected from the network, so the message is held in the session queue having session ID SID-B and its binding still remains so the publish from Subscriber A will be delivered upon reconnect. Subscribers C and D have session queues bound to the global exchange with the routing key "a/b", enabling them to immediately receive the publish via respective agents 102c, 102d. The contextual synchronization of the present invention thereby allows storage and delivery of application data synchronized in near real-time, across multiple app instances/devices/users, supporting online and offline operation with enforced access controls, while using resources efficiently.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for dynamically distributing persistent data comprising:

receiving at a first agent a publication request from a first client to publish a specific data value to a specific data path of a data storage server having a variety of data values stored in different data paths;

the first agent determining that the first client is entitled to publish to the specific data path based on an access control list uniquely associated with the specific data path, transmitting a write request to the data storage server, receiving a write acknowledgement from the data storage server, and transmitting the specific data value and the specific data path as a publication;

receiving at a second agent a subscription request from a second client to subscribe to the specific data path;

receiving the publication and the subscription at a master routing exchange;

the second agent creating a client message exchange and client session queue with a routing configuration that directs publications which the second client is entitled to receive and match the subscription request from the master routing exchange to the client session queue;

the master routing exchange receiving the publication and performing message routing as configured by the second agent, which delivers the publication to the client session queue; and further receiving at the second agent the contents of the client session queue and transmitting a corresponding subscription update to the second client.

2. The method of claim 1 wherein the subscription request includes a path pattern having one or more wildcard characters defining a set of paths which include the specific data path.

3. The method of claim 1 wherein the data storage server receives the write request, durably writes the specific data value to the specific data path, and sends the write acknowledgement to the first agent.

4. The method of claim 1 wherein the data storage server maintains a server log of publications ordered by a virtual time stamp which represents a relative time of receipt of a given publication request, and maintains a table containing latest data values for the publications, and the second client maintains a client log of certain publications received as subscription updates ordered by the virtual time stamp, and provides a client count of all entries in the client log which both match the subscription and have a corresponding virtual time stamp that lies between a current reliable time stamp and a proposed reliable time stamp;

and further comprising:

the data storage server providing a server count of all entries in the server log which match the subscription, have a corresponding virtual time stamp that lies between the current reliable time stamp and the proposed reliable time stamp, and have an access control list that permits read access to the second client; and the second agent receiving the client count with a request to advance the current reliable time stamp to the proposed reliable time stamp, determining that the server count is greater than the client count, and responsively sending a frontier of data comprising a set of non-redundant publications, including the latest data values, which match the subscription, have a virtual time stamp which lies between the current reliable time stamp and the proposed reliable time stamp, and have an access control list that permits read access to the second client.

5. The method of claim 4 wherein the data storage server periodically computes a minimum virtual time stamp, and trims the server log by removing any entries having a corresponding virtual time stamp which is less than the minimum virtual time stamp.

6. The method of claim 5 wherein the data storage server employs a feedback control loop to select the minimum virtual time stamp to determine a smallest data storage server log necessary to achieve a target level of clients with reliable time stamps greater than the minimum virtual time stamp.

7. The method of claim 1 wherein said transmitting of the corresponding subscription update is a push transmission using a bidirectional communications protocol.

8. A system for dynamic distribution of persistent data comprising:

a plurality of agents including a first agent which receives a publication request from a first client to publish a specific data value to a specific data path of a data storage server having a variety of data values stored in different data paths, and a second agent which receives a subscription request from a second client to subscribe to the specific data path, wherein the first agent determines that the first client is entitled to publish to the specific data path based on an access control list uniquely associated with the specific data path, transmits a write request to the data storage server, receives a write acknowledgement from the data storage server, and transmits the specific data value and the specific data path as a publication, and the second agent creates a client session queue specific to the second client; and a master routing exchange which receives the publication, wherein the second agent further configures routing exchange bindings to direct publications the second client is entitled to receive and match the subscription request from the master routing exchange to the client session queue, the master routing exchange performs message routing as configured by the second agent which delivers the publication to the session queue for the second client, and the second agent receives the contents of the client session queue and transmits a corresponding subscription update to the second client.

9. The dynamic distribution system of claim 8 wherein the subscription request includes a path pattern having one or more wildcard characters defining a set of paths which include the specific data path.

10. The dynamic distribution system of claim 8 wherein the data storage server receives the write request, durably writes the specific data value to the specific data path, and sends the write acknowledgement to the first agent.

11. The dynamic distribution system of claim 8 wherein:

the second client maintains a client log of certain publications received as subscription updates ordered by a virtual time stamp representing a relative time of receipt of a given publication request, and provides a client count of all entries in the client log having a corresponding virtual time stamp that lies between a current reliable time stamp and a proposed reliable time stamp;

the data storage server maintains a server log of publications to the specific data path ordered by the virtual time stamp, maintains a table containing latest data values for the publications, and provides a server count of all entries in the server log which match the subscription, have an access control list that permits read access to the second client, and have a corresponding virtual time stamp that lies between the current reliable time stamp and the proposed reliable time stamp; and the second agent receives the client count with a request to advance the current reliable time stamp to the proposed reliable time stamp, determines that the server count is greater than the client count, and responsively sends a frontier of data comprising a set of non-redundant publications, including the latest data values, which match the subscription, have an access control list that permits read access to the second client, and have virtual time stamps which lie between the current reliable time stamp and the proposed reliable time stamp.

12. The dynamic distribution system of claim 11 wherein the data storage server periodically computes a minimum virtual time stamp, and trims the server log by removing any entries having a corresponding virtual time stamp which is less than the minimum virtual time stamp.

13. The dynamic distribution system of claim 12 wherein the data storage server employs a feedback control loop to select the minimum virtual time stamp to determine a smallest data storage server log necessary to achieve a target level of clients with reliable time stamps greater than the minimum virtual time stamp.

14. The dynamic distribution system of claim 8 wherein said second agent transmits the corresponding subscription update as a push transmission using a bidirectional communications protocol.

15. A method of synchronizing data in a local store of a client comprising:

sending a subscription request from the client to a network, the subscription request being directed to a specific data path of a data storage server having a variety of data values stored in different data paths;

receiving one or more subscription updates at the client for the specific data path;

maintaining a client log of the subscription updates ordered by a virtual time stamp which represents a relative time of receipt of a given publication request corresponding to a given one of the subscription updates;

maintaining a current reliable time stamp indicating the largest virtual time stamp for which the client is assured of holding the most recent value for the specific data path;

determining a client count of subscription updates matching the specific data path and having corresponding virtual time stamps that lie between the current reliable time stamp and a later proposed reliable virtual time stamp;

transmitting an advance request from the client to the network to promote the current reliable time stamp to the proposed reliable time stamp, the advance request including the specific data path and the client count;

receiving a response at the client indicating that the client count is less than a corresponding server count; and receiving at the client a frontier of data comprising a set of non-redundant updates which both match the subscription request and have virtual time stamps which lie between the current reliable time stamp and the proposed reliable time stamp.

16. The method of claim 15 further comprising writing the frontier of data to the local store of the client.

17. The method of claim 15 wherein the client sends multiple subscription requests to the network for a set of the different data paths.

18. The method of claim 15 wherein the subscription request is directed to a path pattern having one or more wildcard characters defining a set of paths matching the subscription request.

19. The method of claim 15 wherein the client provides a unique session ID with the subscription request.

20. The method of claim 15 further comprising:

sending a publication request from the client to the network to publish a specific data value to the specific data path;

storing the specific data path and the specific data value to the local store of the client;

receiving an acknowledgement that the specific data value has been written to the specific data path as part of a write operation; and updating an entry in the local store for the specific data path with a virtual time stamp assigned to the write operation by the data storage server.

* * * * *